United States Patent
Wu et al.

(10) Patent No.: US 8,060,706 B2
(45) Date of Patent: Nov. 15, 2011

(54) METHOD OF ALLOCATING PHYSICAL MEMORY IN SPECIFIED ADDRESS RANGE UNDER LINUX SYSTEM PLATFORM

(75) Inventors: Bo Wu, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 901 days.

(21) Appl. No.: 12/058,033

(22) Filed: Mar. 28, 2008

(65) Prior Publication Data

US 2009/0249019 A1    Oct. 1, 2009

(51) Int. Cl.
*G06F 12/00* (2006.01)
*G06F 13/00* (2006.01)
*G06F 13/28* (2006.01)

(52) U.S. Cl. ............... 711/154; 711/170; 711/E12.002

(58) Field of Classification Search .......... None
See application file for complete search history.

(56) References Cited

U.S. PATENT DOCUMENTS

| | | | | |
|---|---|---|---|---|
| 4,493,027 A * | 1/1985 | Katz et al. | ...... | 712/228 |
| 5,526,506 A * | 6/1996 | Hyatt | ...... | 711/111 |
| 7,107,322 B1 * | 9/2006 | Freeny, Jr. | ...... | 709/217 |
| 7,571,295 B2 * | 8/2009 | Sakarda et al. | ...... | 711/165 |
| 2005/0188157 A1 * | 8/2005 | Kashyap | ...... | 711/130 |
| 2005/0228630 A1 * | 10/2005 | Tseng et al. | ...... | 703/19 |
| 2007/0033367 A1 * | 2/2007 | Sakarda et al. | ...... | 711/170 |
| 2007/0261123 A1 * | 11/2007 | Bade et al. | ...... | 726/27 |
| 2007/0288682 A1 * | 12/2007 | Czajkowski et al. | ...... | 711/2 |
| 2010/0271856 A1 * | 10/2010 | Yamazaki | ...... | 365/51 |

* cited by examiner

*Primary Examiner* — Pierre-Michel Bataille
*Assistant Examiner* — Matthew Chrzanowski
(74) *Attorney, Agent, or Firm* — Muncy, Geissler, Olds & Lowe, PLLC

(57) ABSTRACT

A method of allocating a physical memory in a specified address range under a Linux system platform is applied in a testing process of a physical memory under a Linux operating system. In this method, according to a specified address range and a size of a memory to be allocated, a large amount of physical memories in the system are allocated in a specified address range, and then the information about the allocated memories is transmitted, so as to map, inspect, and release the memories, thereby effectively supporting the test for physical memories under the Linux operating system.

8 Claims, 5 Drawing Sheets

METHOD OF ALLOCATING PHYSICAL MEMORY IN SPECIFIED ADDRESS RANGE UNDER LINUX SYSTEM PLATFORM

BACKGROUND OF THE INVENTION

1. Field of Invention

The present invention relates to a method of allocating a memory, and more particularly to a method of allocating a physical memory in a specified address range under a Linux system platform.

2. Related Art

Currently, a memory test plays a very important role in a hardware diagnosis solution, which mainly includes two parts: memory allocation and test algorithm. The test algorithm specifies the rules for reading and writing memories, and different test algorithms are directed to inspecting different types of memory errors. Relevant information about conventional test algorithms has been specially introduced in documents about memory test algorithms, which will not be repeated herein. The memory allocation is an important precondition for a memory read/write test, which directly influences whether the test effect may be achieved or not, for example, whether the true physical memory can be tested or whether the same memory is repeatedly tested. However, different operating systems manage physical memories in different manners, without uniform rules. Therefore, the memory allocation is relatively complicated, and should be performed in consideration of different operating systems.

Under a Linux operating system platform (a multi-user computer operating system free of charge), since no method of allocating a physical memory is provided in a user mode, it can do nothing but allocate a physical memory in a kernel through a driver and then provide an interface in the conventional method. However, in order to read and write a physical memory at will in the user mode, the allocated physical memory further needs to be mapped into a virtual address space in the user mode. At this point, the principles and methods in the conventional art are quite similar, which thus will not be repeated herein, and the main difference lies in the method of allocating a physical memory.

Currently, there are two methods of allocating a physical memory in the conventional art.

The first method is a method of allocating specified physical memory pages. In this method, the physical memory may be allocated in a specified address range, page is taken as the minimum unit for allocating physical memory, and the size of one page is determined depending upon the configuration of a Linux system kernel. However, this method can only allocate one memory page each time, has low efficiency, and may possibly occupy other adjacent memory pages, thereby resulting in wasting of resources. Therefore, this method has a great limitation and is not suitable for testing a large amount of physical memories.

The second method is to directly call an interface of continuous physical memories that have been allocated into memory blocks provided by the Linux system kernel. This method can be used to allocate a large amount of physical memories, which thus is suitable for testing a large amount of physical memories. However, the main disadvantage of this method lies in that, it cannot allocate the physical memories in a specified address range (due to being restricted by a data structure for organizing the physical memories in the Linux system kernel). Therefore, this method cannot be used to test specific memory units or memories in specified slots.

SUMMARY OF THE INVENTION

In order to solve the problems and eliminate the defects in the conventional art, the present invention is directed to a method of allocating a physical memory in a specified address range under a Linux system platform, which is applied in a test process of a physical memory in a Linux operating system. According to a specified address range and a size of the memory to be allocated, the method is used to allocate a large amount of physical memories in the system in a specified address range, thereby providing efficient support for the test of the physical memory in a Linux operating system.

The present invention provides a method of allocating a physical memory in a specified address range under a Linux system platform, which includes the following steps.

A specified address range and a size of memory to be allocated are obtained, in which each node in the system is examined to determine whether the memory address range at each node has an intersection with the specified address range or not; if an intersection is found, each zone in the node is examined to determine whether the memory address range at each zone has an intersection with the specified address range or not; if an intersection is further found, memory blocks meeting the size and specified address range requirements are searched in a memory block list of per-CPU page frame cache and buddy system in each zone; the obtained memory blocks are split and then taken out from the memory block list; and the memory blocks meeting the size and specified address range requirements are repeatedly searched in each zone, and then split and take out the memory blocks, till the required size of memory has been successfully allocated, no memory blocks meeting the specified address range requirement are found in each zone, or a free memory in each zone is reduced to a lower limit of the system kernel security, so as to transmit the information about all allocated memory blocks, and thus mapping, inspecting, and releasing the memory blocks.

In view of the above, the present invention has the following advantages.

The method of allocating a physical memory in a specified address range under a Linux system platform provided by the present invention can be used for allocating a large amount of physical memories in a specified address range, which provides a functional interface for allocating a plurality of pages/blocks at one time through improving the overall allocation flow, and improves searching mode and enhances searching speed through using the data structure in the kernel. Meanwhile, through splitting memories, the method of the present invention avoids occupying redundant memories. Therefore, the method of the present invention not only combines the advantages of the above two methods of allocating a physical memory in the conventional art, but also overcomes the defects of such conventional methods, thereby providing efficient support for the test of physical memories in a Linux operating system. The main advantages thereof lie in that, these are the physical memories that are allocated; the allocation is performed in the specified address range; a large amount of memories can be allocated at one time; and no other adjacent memory pages are occupied, thereby avoiding the problem of wasting resources in the conventional art; and it is capable of testing specific memory units or memories in a specified slot.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
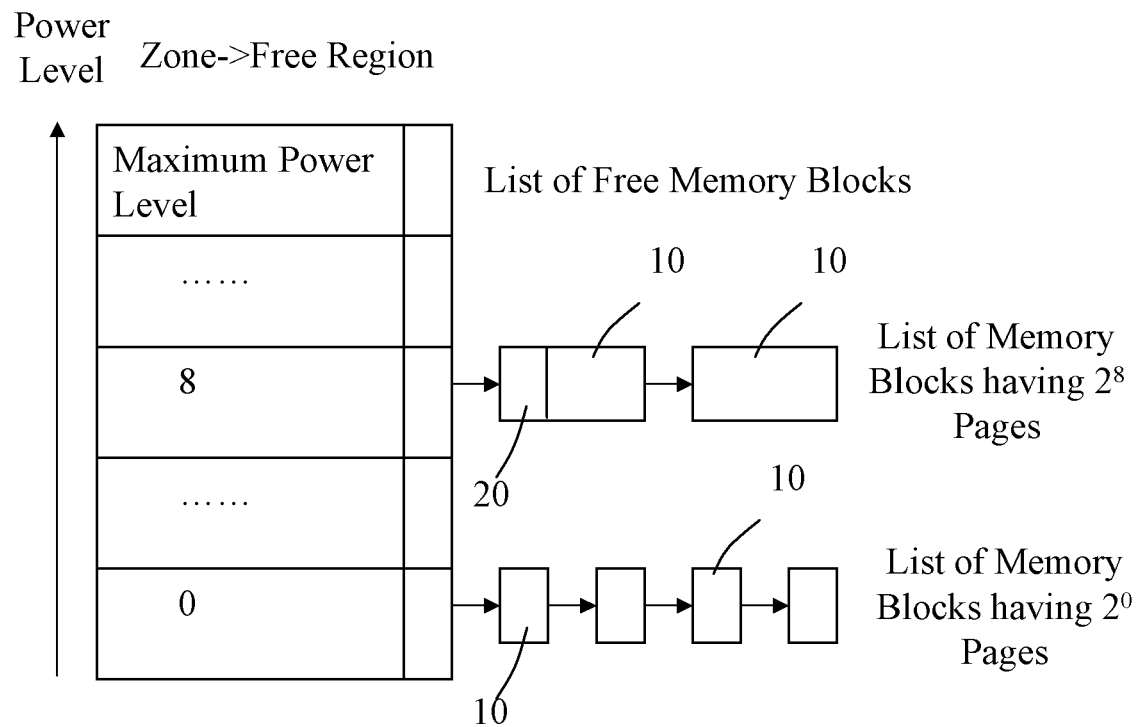
FIG. 1 is a structural view of a memory block in a buddy system according to the present invention.

The preferred embodiments of the present invention will be described below in detail with reference to the drawings.

In a Linux system, a kernel includes a memory management mechanism. A memory exists in a system in a form of pages, in which each page represents a unique physical memory. The system describes the information about such a page through one data structure, and stores the pages together in a form of an array according to the positions of the pages in the physical memory, and uses a global pointer of the page structure to point to a first address of the array. Therefore, once the first address of the array is obtained, any page structure in the memory can be obtained. Of course, each page in the memory cannot be operated at will. The Linux system has its own memory management mechanism, and thus, the object of the present invention should be achieved without violating the system rules. The process of achieving the present invention is described as follows.

Once the Linux system is booted, the kernel allocates a physical memory into a plurality of pages, and marks each page into two statuses, namely, occupied or unoccupied (available). The pages marked with occupied are those occupied by the system kernel or other hardware and applications, which cannot be used by users, since the operations for these pages may cause crash of the whole system. Therefore, the allocation method provided by the present invention is not permitted to allocate this part of memory. Usually, this part is merely a small part of the whole memory, which is about tens of MB. Generally, if this part of memory fails, the system cannot be booted, not mentioning the allocation and testing operations. In the Linux system, the physical memory at each node is divided into a plurality of blocks, called zones, and each zone indicates a segment of the memory. The zone is described through using a zone structure, which tracks the messages about the page frame usage, free region, and lock. The types of zones mainly include Direct Memory Access Zone (DMA Zone), Normal Zone, and Highmem Zone. The zone may make the page allocation have more directivity, thereby reducing memory fragmentation. The DMA zone is located in a low-end memory space and used for some old Industry Standard Architecture (ISA) devices. In the normal zone, the memory is directly mapped to a high-end portion of a linear address space of a Linux system kernel, and most of the kernel operations can only be performed in the normal zone.

The unoccupied (available) pages in each zone are linked into a list structure according to a buddy algorithm. Herein the page allocation in each zone adopts the buddy algorithm, and a zone structure is introduced into a kernel page allocator for the buddy algorithm, in which one zone is a large continuous physical page. In the buddy algorithm, the whole zone is divided into a collection of all levels of page blocks in a unit of an integer power of 2, adjacent page blocks at the same level are called buddies, and a pair of buddies may be combined into a page collection at a higher level for linking as a list structure.

The Linux system kernel manages the physical memories in different levels by using nodes, zones, and pages, and the free memory pages are mainly managed with a list structure in a per-CPU page frame cache and a buddy system. The memory pages 20 in the buddy system are organized in a unit of the integer power of 2, i.e., $2^n$ continuous memory pages 20 constitute one memory block 10 as an element of the list, so as to be managed unitedly. According to the different size, the memory blocks 10 are connected into different lists, and the structure thereof is shown in FIG. 1.

The present invention finds out the memory blocks meeting the requirements through traversing the links (or searching relevant data structures), thereby realizing the allocation of the specified physical memory. Herein, the traversal means to access each node in a tree once only along a certain searching path. The operation of accessing the node depends on specific application problems. Traversal is one of the most important calculations of a binary tree and it is also a basis for other calculations in the binary tree.

Figure 2:
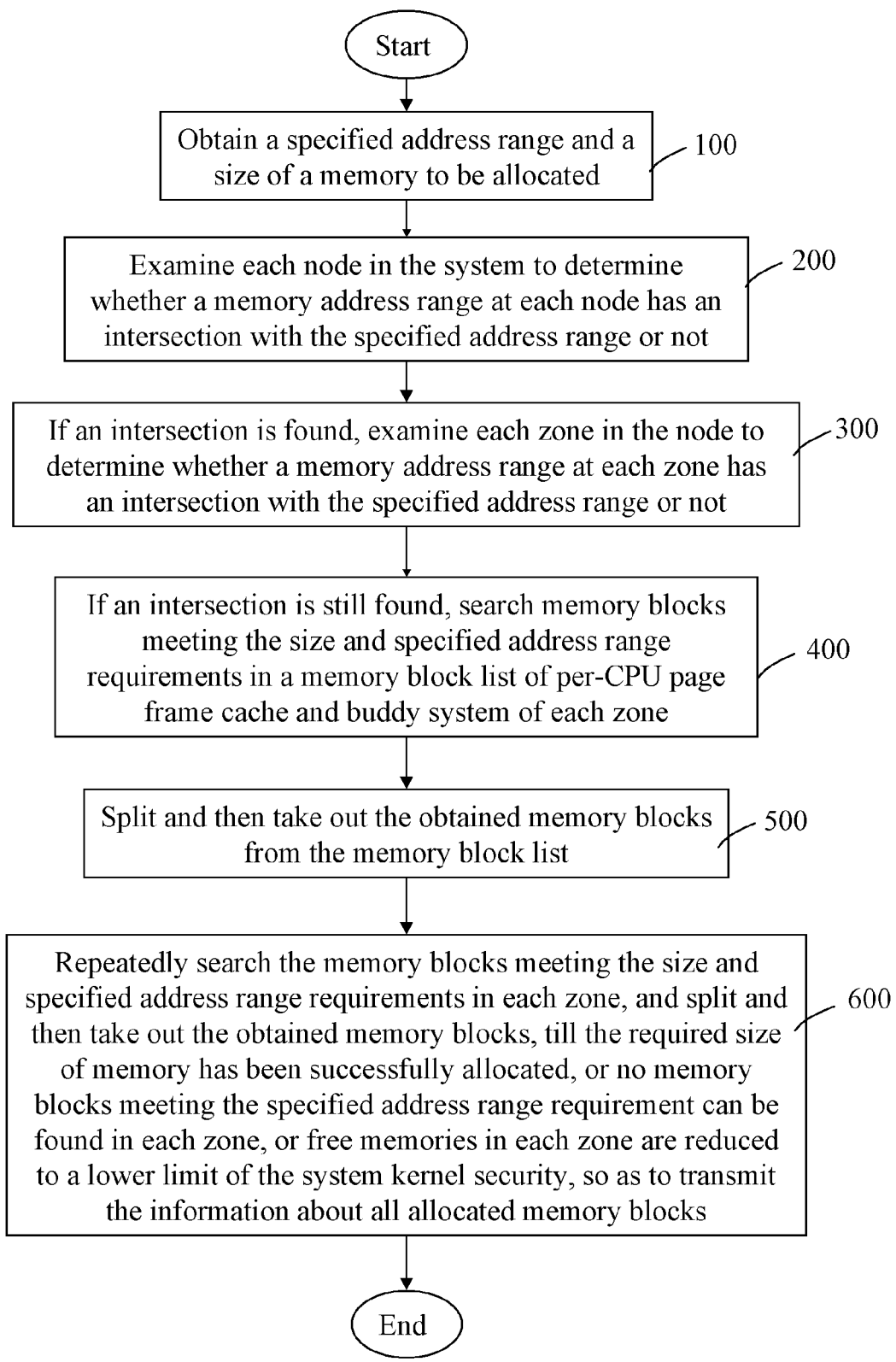
FIG. 2 is a flow chart of a method of allocating a physical memory in a specified address range under a Linux system platform according to the present invention.

Referring to FIG. 2, it is a flow chart of a method of allocating a physical memory in a specified address range under a Linux system platform according to the present invention. As shown in FIG. 2, the method of allocating a physical memory in a specified address range under a Linux system platform provided by the present invention includes the following steps:

obtain a specified address range and a size of a memory to be allocated (Step 100);

examine each node in the system to determine whether a memory address range at each node has an intersection with the specified address range or not (Step 200);

if an intersection is found, examine each zone in the node to determine whether a memory address range at each zone has an intersection with the specified address range or not (Step 300);

if an intersection is still found, search memory blocks meeting the size and specified address range requirements in a memory block list of a per-CPU page frame cache and buddy system of each zone (Step 400);

split and then take out the obtained memory blocks from the memory block list (Step 500); and repeatedly search the memory blocks meeting the size and specified address range requirements in each zone, and split and then take out the obtained memory blocks, till the required size of memory has been successfully allocated, or no memory blocks meeting the specified address range requirement can be found in each zone, or free memories in each zone are reduced to a lower limit of the system kernel security (i.e., the minimum value that can ensure the security of the system kernel), so as to transmit the information about all allocated memory blocks, thereby mapping, inspecting, and releasing the memory blocks (Step 600). To transmit the information about all allocated memory blocks may be performed in the form of an array through an interface.

Furthermore, the method of allocating a physical memory in a specified address range under a Linux system platform provided by the present invention further includes, storing the information about the allocated memory blocks and updating an allocation status (not shown), after the memory blocks are taken out.

In the buddy system, since the memory pages constitute a memory block in a unit of the integer power of 2 ($2^n$), the present invention decomposes the size to be allocated into the sum of the integer powers of 2. In each zone, the memory pages are allocated according to the descending sequence of the exponent, for example, if 1048 memory pages need to be allocated, $1048=2^{10}+2^4+2^3$. Therefore, a memory block with the size of $2^{10}$ needs to be firstly allocated. If it is successfully allocated, there are $24=2^4+2^3$ memory pages to be allocated, and the next step is to allocate a memory block with the size of $2^4$. If the allocation fails, the $1048=2^9\times2+2^4+2^3$ memory pages need to be allocated, and the next step is to allocate two memory blocks with the size of $2^9$, and so forth. In this way, the existed memory blocks may not be split as much as possible, thereby ensuring the continuity of the free memory pages and reducing the influence on the system performance.

The technical means adopted by the method of allocating a physical memory in a specified address range under a Linux system platform provided by the present invention to search memory blocks meeting the requirements and split the memory blocks is illustrated below.

1. Search Memory Blocks Meeting the Requirements

Figure 3:
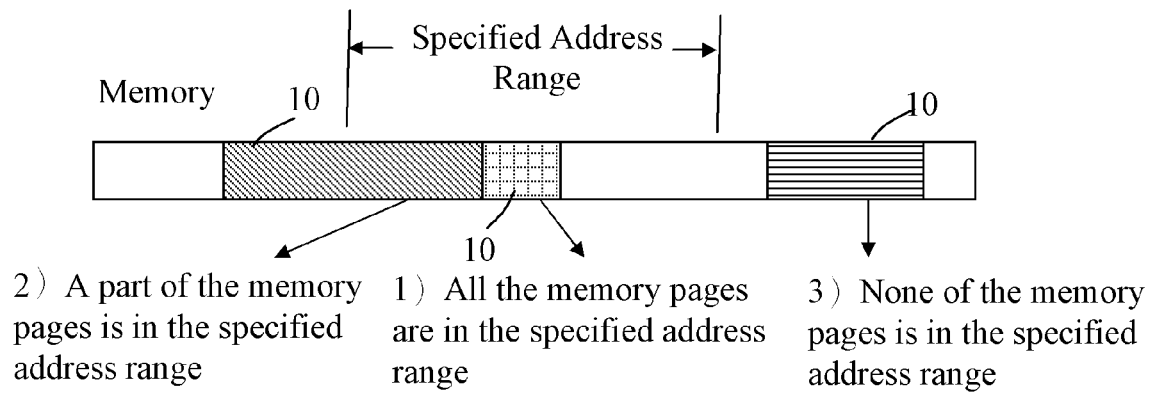
FIG. 3 is a schematic view of classifying the memory blocks into three types according to the specified address range in the present invention.

As shown in FIG. 3, according to the specified address range requirement, there are three kinds of memory blocks 10: (1) all the memory pages in the memory block are in the specified address range; (2) a part of the memory pages is in the specified address range; and (3) none of the memory pages is in the specified address range.

The memory blocks in types of (1) and (2) both meet the address range requirement. In type (1), all the memory pages are in the specified address range, and can be directly taken out from the list; in type (2), a part of the memory pages is in the specified address range, and small memory blocks meeting the address range requirement may be taken out through splitting. Therefore, the above two types of memory blocks are both the objects searched by the method of the present invention. Besides meeting the specified address range requirement, the memory block also needs to meet the requirement for the size of the memory to be allocated. The present invention imitates the method in the kernel of the buddy system in the conventional art to search the memory blocks meeting the requirement for the size of the memory to be allocated, and the operating sequence is listed as follows: searching in a list of memory blocks with the same size as required; and if no memory blocks are found, searching in a list of memory blocks with a larger size than the size required (because a larger memory block can always be split into small memory blocks).

In the conventional art, there are two specific searching methods. That is, (1) traversing the memory block list, which is also the means adopted in the first method in the conventional art; and (2) searching through using a data structure in the system kernel (which may be varied depending upon different versions, for example, in the kernels of Version 2.6.10 and former versions, each list has a corresponding bitmap to indicate the status of each buddy; whereas in the kernels of versions following Version 2.6.10, each page structure has a field to indicate whether it is in the buddy system or not). The aforementioned two conventional methods have their own disadvantages, the former is relatively time-consuming if the list has many nodes; and the latter has lower efficiency than the former if the list has a few elements.

The method provided in the present invention combines the aforementioned two methods together, and the selected principles are described as follows. As for the kernels of Version 2.6.10 and former versions, since the searching speed of bitmaps is higher than that of the list, it always searches through using the bitmaps; and as for the kernels of versions following the Version 2.6.10, if the number of nodes in the list is larger than the total number of memory blocks in the specified address range, that is, the number of nodes in the list>(end address−start address)/the size of the memory blocks, it searches through the field in the page structure, otherwise, it searches through the list.

2. Split the Memory Block

In the first method of the conventional art, when allocating the specified memory pages, the whole memory block including the memory pages will be taken out, which occupies other memory pages adjacent to the specified memory pages for no reason. The method of the present invention involves a process of splitting a memory block, thereby avoiding such unnecessary waste of resources. The specific process of splitting the memory block is described as follows.

As for the memory block with all the memory pages in the specified address range, if the size of the memory to be allocated is smaller than that of the memory block, the memory block is split according to the splitting process in the system kernel of the conventional art, thereby obtaining the first small memory block with the required size.

Figure 4:
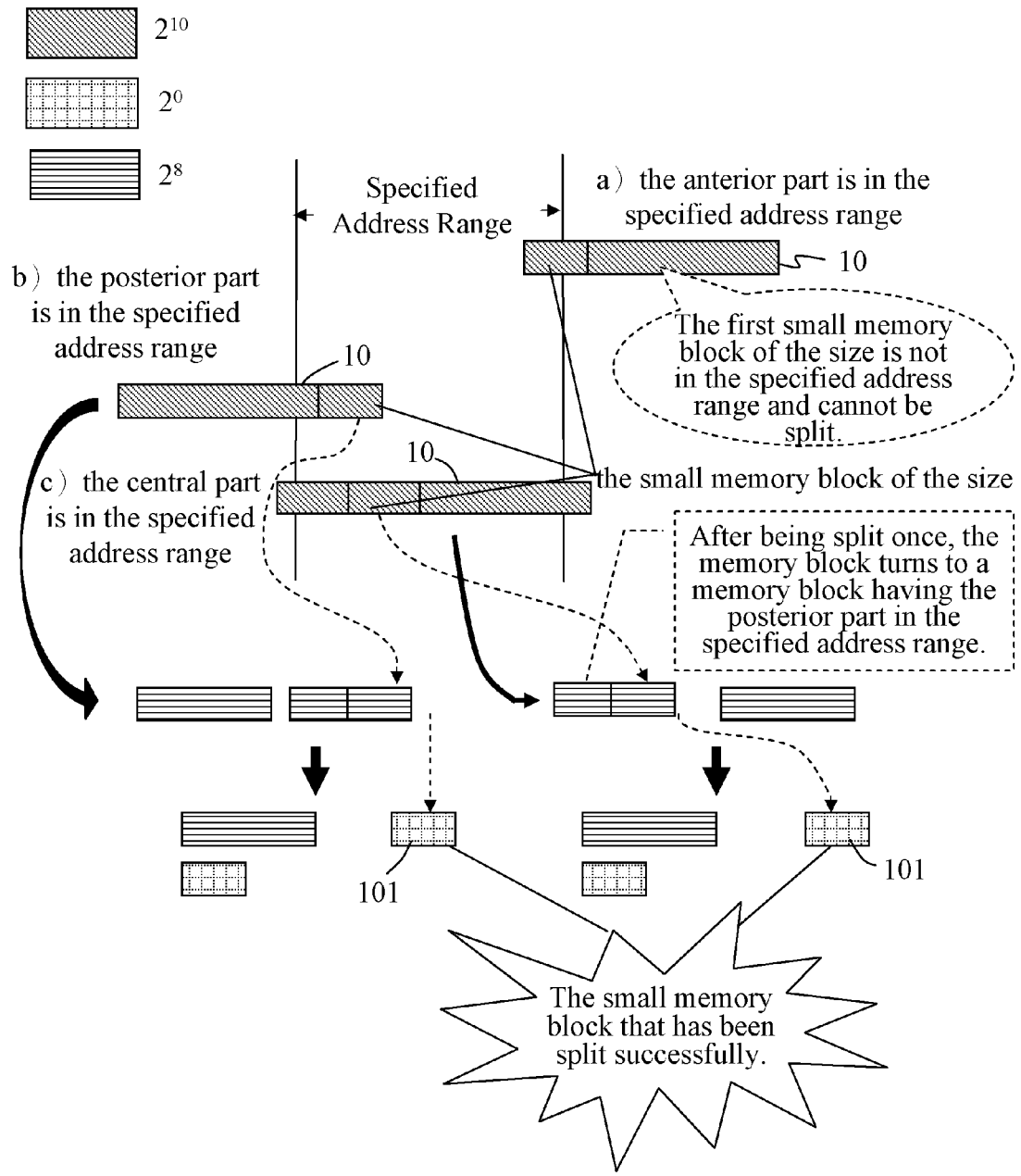
FIG. 4 is a schematic view of memory blocks with a part of memory pages in the specified address range and a splitting process thereof in the present invention.

As for the memory block with a part of memory pages in the specified address range, the situation is complicated. Referring to FIG. 4, there are three specific conditions: a) the anterior part is in the specified address range; b) the posterior part is in the specified address range; and c) the central part is in the specified address range.

It is assumed that a small memory block with a size is to be allocated in the specified address range. After obtaining the memory block 10 meeting the requirements, the splitting process is described as follows.

(1) In the memory block 10, if the first small memory block with the size is in the specified address range, the first small memory block with the size may be taken out through splitting. As such, the circumstances that the whole memory block and the anterior part of the memory block are in the specified address range are processed. Of course, if the first small memory block with the size is not in the specified address range, the memory block cannot be split.

(2) In the memory block 10, if the last small memory block with the size is in the specified address range, the last small memory block 101 with the size may be obtained through splitting. As such, the circumstance that the posterior part is in the specified address range is processed.

(3) In the memory block 10, if the central part is in the specified address range, i.e., the start address and end address of the specified address range both fall within the memory block 10, it can be processed by merely splitting the memory block 10, and the specific processing method is described as follows. The memory block 10 is continuously split till the memory blocks meeting the above two conditions of (1) and (2) are found, and then, the small memory block 101 is obtained through splitting. As such, the circumstance that the central part is in the specified address range is processed.

The specific splitting process is similar to the conventional method in the kernel of the conventional art, but the conventional method can only take out the first small memory block. The present invention can take out the last small memory block through improving the splitting process, and can take out any small memory block in the central part through combining the method of taking out the first small memory block with the method of taking out the last small memory block and further adding the determination conditions.

Figure 5:
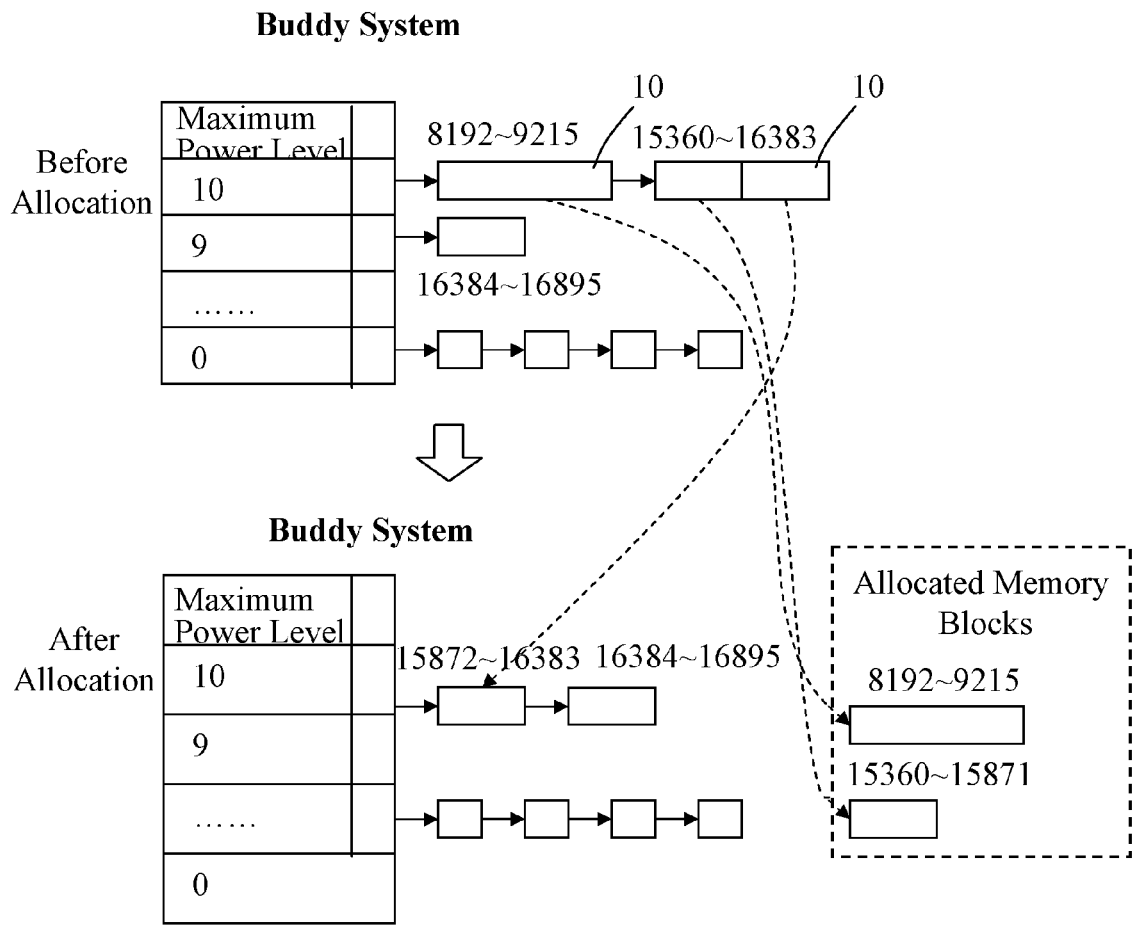
FIG. 5 is a schematic view of a method according to one embodiment of the present invention, which shows the circumstances before and after allocating the memory blocks in the buddy system of the present invention.

Then, referring to FIG. 5, the specific implementation of the technical solution of the present invention is further described through an embodiment.

It is assumed that a memory of 10 M is allocated in an address range of 32 M-63 M.

In the method of the present invention, firstly, the specified address range is converted into a memory page number range 8192-16127 (it is assumed that 4 K is taken as one page).

It is assumed that, under a Linux system platform, the Linux kernel considers all the memories as one node, the node is divided into three zones, i.e., Direct Memory Access Zone (DMA Zone), Normal Zone, and Highmem Zone, and the page number ranges corresponding to the three zones are respectively 0-4095, 4096-229375, and 229376-362143. In this manner, only the Normal Zone has an intersection with the specified address range, so only this zone needs to be processed.

The memory of 10 M includes $2560=2^{11}+2^9$ memory pages. However, since the largest memory block in the buddy system only includes $2^{10}$ memory pages, the memory of 10 M should be decomposed into $2560=2^{10}\times 2+2^9$ memory pages.

Firstly, it searches in a list of memory blocks including $2^{10}$ pages. It is assumed that one memory block 10 is found, and its corresponding number range is 8192-9215. Such a memory block 10 is just in the specified address range, and the size thereof is just the size of the memory to be allocated, so that the memory block 10 may be taken out directly. Then, a corresponding memory page is set to store relevant information and to update the allocation status.

Since there are still $1536=2^{10}+2^9$ pages waiting for being allocated, it further searches in a list of memory blocks having $2^{10}$ pages. It is assumed that another memory block 10 is further found, and its corresponding number range is 15360-16383. A part of the pages of the memory block is in the specified address range, but the memory block to be allocated cannot be obtained through splitting; and thus, the allocation cannot be performed. At this time, no memory block meeting the requirement can be found in the list of memory blocks having $2^{10}$ pages.

In this way, the number of the pages to be allocated is still $1536=2^{10}+2^9$. Since the memory block of $2^{10}$ has been allocated, it is decomposed to $1536=2^9\times 3$, i.e., three memory blocks of $2^9$ need be allocated.

Then, it searches in a list of memory blocks having $2^9$ pages. It is assumed that no memory blocks meeting the specified address range are found, and the process returns to searching in the list at the previous level (i.e., the list of memory blocks having $2^{10}$ pages). In this manner, the memory block 10 with the corresponding number range of 15360-16383 is just found. The required size in this time is $2^9$ pages. The first small block of $2^9$ in the memory block with the number range 15360-15871 just meets the requirement. Therefore, the anterior part may be allocated through splitting, and the posterior part may be put into the list at the next level.

Subsequently, it further searches in the list of memory blocks having $2^{10}$ pages, but no memory blocks meeting the requirement can be found.

At this time, the number of the pages to be allocated is $1024=2^8\times 4$. The above processes are sequentially repeated, till the memory to be allocated has been successfully allocated, no memory blocks meeting the specified address range requirement can be found in each zone, or free memories in each zone are reduced to a lower limit of the system kernel security ((i.e., the minimum value that can ensure the security of the system kernel), so as to transmit the information about all allocated memory blocks, thereby mapping, inspecting, and releasing the memory blocks.

What is claimed is:

1. A method of allocating a physical memory in a specified address range under a Linux system platform, applied in a test process of a physical memory in a Linux operating system, the method comprising:
    obtaining a specified address range and a size of a memory to be allocated;
    examining each node in the system to determine whether a memory address range at each node has an intersection with the specified address range or not;
    if an intersection is found, examining each zone in the node to determine whether a memory address range at each zone has an intersection with the specified address range or not;
    if an intersection is further found, searching memory blocks meeting the size and specified address range requirements in a memory block list of per-CPU page frame cache and buddy system at each zone;
    splitting and then taking out the memory blocks from the memory block list; and
    repeatedly searching memory blocks meeting the size and specified address range requirements in each zone, and splitting and then taking out obtained memory blocks, till the required size of memory has been successfully allocated, or no memory blocks meeting the specified address range requirement are found in each zone, or free memories in each zone are reduced to a lower limit of system kernel security, so as to transmit information about all allocated memory blocks, and thereby mapping, inspecting, and releasing the memory blocks.

2. The method of claim 1, wherein the memory blocks meeting the specified address range requirement comprise:
    memory blocks with all the memory pages falling in the specified address range; and
    memory blocks with a part of the memory pages falling in the specified address range.

3. The method of claim 1, wherein the process of searching the memory blocks meeting the size requirement of the memory to be allocated comprises:
    searching the memory blocks in a list of memory blocks having the same size as the memory to be allocated; and
    if no memory blocks are found, searching the memory blocks in a list of memory blocks having a size larger than the memory to be allocated.

4. The method of claim 3, wherein the searching process comprises traversing the memory block list and searching through using a data structure of a system kernel.

5. The method of claim 1, wherein the process of splitting the memory blocks comprises:
    as for the memory block with all the memory pages falling in the specified address range, if a size of a memory to be allocated is smaller than that of the memory block, obtaining a first small memory block having the required size through splitting; and
    as for the memory block with a part of memory pages falling in the specified address range, if a small memory block with a preset size is to be allocated in the specified address range, splitting the memory block according to three circumstances that the part of memory pages in the specified address range is located in an anterior part, a posterior part, or a central part.

6. The method of claim 5, wherein the process of splitting the memory block according to the three circumstances that the part of memory pages in the specified address range is located in an anterior part, a posterior part, or a central part of the memory block is corresponding to the following three modes:

(1) in the memory block, if the first small memory block with the preset size is in the specified address range, the first small memory block with the preset size is taken out through splitting;
(2) in the memory block, if the last small memory block with the preset size is in the specified address range, the last small memory block with the preset size is taken out through splitting; and
(3) in the memory block, if a start address and an end address of the specified address range both fall in the memory block, the memory block is split continuously till the memory blocks satisfying the above circumstances (1) and (2) are found, and then a small memory block with a preset size is obtained through splitting.

7. The method of claim 1, after the memory block is taken out, further comprising a step of storing information about the allocated memory block and updating an allocation status.

8. The method of claim 1, wherein information about all the allocated memory blocks is transmitted in the form of an array through an interface.

* * * * *